United States Patent
Cheng et al.

(10) Patent No.: US 9,736,293 B2
(45) Date of Patent: Aug. 15, 2017

(54) TERMINAL AND SPECIFIED CONTENT DELETION METHOD

(71) Applicants: DONGGUAN YULONG TELECOMMUNICATION TECH CO., LTD., Guangdong (CN); YULONG COMPUTER TELECOMMUNICATION SCIENTIFIC (SHENZHEN) CO., LTD., Guangdong (CN)

(72) Inventors: Weide Cheng, Guangdong (CN); Wenjian Yang, Guangdong (CN)

(73) Assignees: DONGGUAN YULONG TELECOMMUNICATION TECH CO., LTD., Guangdong (CN); YULONG COMPUTER TELECOMMUNICATION SCIENTIFIC (SHENZHEN) CO., LTD., Guangdong (CN)

( * ) Notice: Subject to any disclaimer, the term of this patent is extended or adjusted under 35 U.S.C. 154(b) by 0 days.

(21) Appl. No.: 14/655,146

(22) PCT Filed: Dec. 24, 2012

(86) PCT No.: PCT/CN2012/087341
§ 371 (c)(1),
(2) Date: Jun. 24, 2015

(87) PCT Pub. No.: WO2014/100956
PCT Pub. Date: Jul. 3, 2014

(65) Prior Publication Data
US 2015/0334222 A1   Nov. 19, 2015

(51) Int. Cl.
*H04L 12/58*   (2006.01)
*H04M 1/725*   (2006.01)
(Continued)

(52) U.S. Cl.
CPC ....... *H04M 1/72552* (2013.01); *G11B 27/031* (2013.01); *H04W 8/183* (2013.01); *H04W 4/14* (2013.01)

(58) Field of Classification Search
CPC .............. H04M 1/72547; H04W 88/02; G06F 17/30312; G06F 17/30613
(Continued)

(56) References Cited

U.S. PATENT DOCUMENTS 6,934,738 B1 *   8/2005   Furusawa ............ G06Q 10/107
                                                   709/206
2002/0193128 A1   12/2002   Park
(Continued)

FOREIGN PATENT DOCUMENTS

CN         1809186 A     7/2006
CN       101404691 A     4/2009
(Continued)

OTHER PUBLICATIONS

International Search Report dated Oct. 3, 2013 issued in International Application No. PCT/CN2012/087341.
(Continued)

*Primary Examiner* — Dung Hong
(74) *Attorney, Agent, or Firm* — Scully, Scott, Murphy & Presser, P.C.

(57) ABSTRACT

Provided are a terminal and a method for deletion of specified content. The terminal includes: a determination unit for determining whether a specified content meets a present condition when receiving an operation instruction to delete the specified content; and an execution unit for determining whether to execute a deletion operation on the specified content according to a determination result. By means of the technical solution of the present invention, the probability of accidental deletions can be reduced, thereby enabling a deletion operation to be safer.

15 Claims, 9 Drawing Sheets

(51) Int. Cl.
H04W 8/18 (2009.01)
G11B 27/031 (2006.01)
H04W 4/14 (2009.01)

(58) Field of Classification Search
USPC ........ 455/411, 412.1, 412.2, 414.1, 418, 514
See application file for complete search history.

(56) References Cited

U.S. PATENT DOCUMENTS

| | | | |
|---|---|---|---|
| 2004/0153431 A1* | 8/2004 | Bhogal | ............... G06F 21/6227 |
| 2005/0257131 A1* | 11/2005 | Lim | .................. G06F 17/30905 715/205 |
| 2008/0305814 A1* | 12/2008 | Deng | ................ H04M 1/72552 455/466 |
| 2013/0252585 A1* | 9/2013 | Moshir | ................... G06F 21/35 455/411 |

FOREIGN PATENT DOCUMENTS

| | | |
|---|---|---|
| CN | 101697561 A | 4/2010 |
| CN | 102609495 A | 7/2012 |
| EP | 2 400 813 A1 | 12/2011 |

OTHER PUBLICATIONS

Extended European Search Report received in related PCT/CN2012087341 dated Sep. 6, 2016.

\* cited by examiner

TERMINAL AND SPECIFIED CONTENT DELETION METHOD

FIELD OF THE INVENTION

The present invention relates to the field of communication technology, and more particularly to a terminal and a specified content deletion method.

BACKGROUND OF THE INVENTION

Short message service (SMS) is a way of sending short written messages from one mobile phone to another and is one of the most commonly used functions of the mobile phone in use by users. With the long time use of the mobile phone, the number of the SMS will become more and more. However, since the mobile phone has a limited storage space, so the user of the mobile phone need often clean up the SMS in the mobile phone to release memory space. Currently, a method for cleaning up SMS by means of batch deletion function, as shown in FIG. 1, the method mainly includes the following steps:

step 1, entering a batch selection mode;
step 2, checking SMS to be deleted; and
step 3, executing a deleting operation to delete the SMS.

The above-mentioned method is a stable and commonly used method, and can basically meet the requirements of users to quickly clean up extra files. In addition, the present SMS usually has a locking function and can lock some files by means of manually selection in a way that cannot be deleted, thereby avoiding the files being mistakenly deleted.

However, when a user enters the batch selection mode to choose the SMS that need to be deleted, the user can only check or uncheck the SMS in a message list at this time. But when the user is not sure whether some SMS need to be deleted, and wants to read the SMS to further make a decision whether to delete the SMS. However, in the batch selection mode, the user is not allowed to read the content of some SMS in detail, which will cause a lot of inconvenience for the user, and sometimes even cause the user to mistakenly delete the SMS which the user does not want to delete, thereby resulting in a lot of trouble to the user. For example, for the SMS from a strange phone number, when a user enters the batch selection mode, the user still wants to read the content of the SMS, and then makes a decision whether or not delete the SMS corresponding to the strange phone number. As another example, when one contact sends a SMS including someone's phone number, before the user deletes the SMS, the user also wants to read the content of the SMS to make sure the phone number in the SMS has been saved to an address book, and then decides whether to delete it. However, when a user enters the batch selection mode, the user is no longer able to read the content of the SMS in detail, which may lead to the SMS to be deleted before the user saves the phone number included in the SMS sent by someone, thereby causing a lot of inconvenience to the user.

SUMMARY OF THE INVENTION

To solve the above problems, the present disclosure aims to provide a new deletion solution, which can determine whether a selected content can be deleted or not, and flexibly delete the content that needs to be deleted, thereby reducing the probability of accidental deletions.

According to one aspect of the present disclosure, a terminal includes: a determination unit and an execution unit; the determination unit is configured for determining a specified content meets a present condition when receiving an operation instruction to delete the specified content, and the execution unit is configured for determining whether to execute a deletion operation on the specified content according to a determination result.

When a user selects the specified content which needs to be deleted, the determination unit of the terminal can automatically determine whether the specified content can be directly deleted or not according to the preset condition. For example, a short message can include two types of short message such as a special short message including at least one phone number and a common short message exclusive of a phone number. The common short message can be directly deleted, but the terminal will determine whether the phone number in the special short message has been saved or not. Namely, the terminal will determine whether a processing state of the special short message is a completed state or not, that is, the terminal can determine whether the special short message has been processed. If the processing state of the special short message is the completed state, that is, the special short message has been processed, and the specified content meets the preset condition, and then the special short message can be deleted. Thus, when the short messages are deleted one by one or in batches, the terminal can automatically help the user to determine whether to delete the short messages, which can reduce the tedious operation on viewing the short messages, and reduce the probability of accidental deletions at the same time.

Preferably, in the above mentioned technical solution, the terminal can further include a processing unit, and the processing unit can be configured for labeling and processing the specified content according to a preset rule. The determination unit is further configured for determining whether the specified content meets the present condition or not according to a label processing result of the processing unit. In the embodiment of the present disclosure, the preset condition includes types of the specified content and the processing states.

Before the determination unit determines whether the specified content meets the present condition or not, the processing unit need preprocess each specified content, and label and process the specified content according to the preset rule. For example, the preset rule can be applied to an email, in detail, if an email has been checked and answered, then the email can be marked as processed, otherwise, it will be marked as unprocessed. At this point, the preset condition is: the email has been completed processing. Thus, the email that is marked as processed meets the preset condition, and when the user deletes the email, the user can delete the email directly, otherwise will not delete the email. In one embodiment, the preset rule can also be applied to an email with an attachment, if the attachment has been downloaded, then the email can be marked as processed, otherwise, it will be marked as unprocessed. At this point, the preset condition is: the email has been completed processing. Thus, the email that is marked as processed meets the preset condition, and when the user deletes the email, the user can delete the email directly, otherwise will not delete the email. In another embodiment, when the preset rule is applied to an email, if the email has not been checked, then the email will be marked as unprocessed, otherwise, it will be marked as processed. It should be understood that the preset rule can be an integration of the above mentioned several preset rules. For example, if a short message includes any selection or any combination of unchecked phone number, unsaved phone number and unprocessed schedule, then the short message is marked as a special short message, and the processing state of the short message is the completed state. When the user selects to delete the short message, the user also cannot delete the short message.

Preferably, in the above mentioned technical solution, the processing unit is further configured to add tag fields in a database of the specified content; different values of the tag fields represent different types and different processing states of the specified content. The determination unit is further configured to determine whether the type and the processing state of the specified content are the same as the type and the processing state of the preset condition according to the tag field of the specified content. As a determination result, if the type and the processing state of the specified content are the same as the type and the processing state of the preset condition according to the tag field of the specified content, then the determination unit determines that the specified content meets the preset condition; as another determination result, if the type and the processing state of the specified content are different from the type and the processing state of the preset condition according to the tag field of the specified content, then the determination unit determines that the specified content does not meet the preset condition.

Taking the above embodiment as an example, several tag fields such as three tag fields can be added, in detail, the first tag field represents the email category, the second tag field represents whether the attachment in the email has been downloaded (that is, the processing state), and the third tag field is used to store schedule time of the email (the processing state can be figured out by comparing the schedule time with the present time). The first tag field includes a first value and a second value, and the first value represents that the email is a special email (that is, the email includes an attachment or the schedule time), and the second value of the first tag field represents that the email is a common email. The second tag field also includes a first value and a second value, and the first value represents that the attachment of the email has been downloaded, and the second value represents that the attachment has not been downloaded. When the email includes a schedule time, then the value of the third tag field is the schedule time.

Preferably, in the above mentioned technical solution, the processing unit is further configured to set a value of the tag field according to a processing state that whether contact information is stored when the specified content includes the contact information. The determination unit is configured to determine that the specified content meets the preset condition when determining that the processing state of the contact information in the specified content is the same as a processing state of the contact information in the preset condition according to the value of the tag filed.

Preferably, in the above mentioned technical solution, the processing unit is further configured to save the value of the tag field as schedule information when the specified content includes the schedule information. The determination unit is configured to read the value of the tag field, and compare the schedule information with the present time to figure out the processing state of the schedule information, and confirm the specified content meets the preset condition when the processing state of the schedule information in the specified content is the same as that of the schedule information in the preset condition.

Preferably, in the above mentioned technical solution, the processing unit is further configured to set a value of the tag field according to a processing state that whether attachment information is stored when the specified content includes the attachment information. The determination unit is configured to determine that the specified content meets the preset condition when determining that the processing state of the attachment information in the specified content is the same as a processing state of the attachment information in the preset condition according to the value of the tag filed.

Preferably, in the above mentioned technical solution, the processing unit is further configured to set a value of the tag field according to a processing state that whether the specified content is checked or not. The determination unit is configured to determine that the specified content meets the preset condition when determining that the processing state of the specified content is the same as the processing state of the preset condition according to the value of the tag field.

Preferably, in the above mentioned technical solution, the execution unit includes a prompt subunit, and the prompt subunit is configured to prompt the user whether to delete the specified content and determine whether to delete the specified content according to a selection of the user when the determination unit determines that the specified content meets the preset condition.

In one embodiment of the present disclosure, when the determination unit determines that the specified content (such as short messages, multimedia messaging service (MMS)) includes unprocessed information, the prompt subunit can prompt the user whether to delete the specified content or not. Thus, the specified content can be deleted upon receiving a confirmation of the user.

Preferably, in the above mentioned technical solution, the execution unit includes a first shortcut entrance. The first shortcut entrance is configured to provide a quick link on a prompt interface of the prompt subunit, and the quick link is used for viewing detailed information of the specified content. At the same time of prompting the user, the first shortcut entrance can provide the user to view the detailed information of the specified content which meets the preset condition. So that the user can determine whether to delete the specified content after viewing the specified content, which further ensures the accuracy of deleted objects and also improve the user experience.

Preferably, in the above mentioned technical solution, the execution unit further includes a second shortcut entrance. The second shortcut entrance is configured to, when receiving the operation instruction, provide a quick link on a deletion interface, and the quick link is used for viewing the detailed information of the specified content. In one embodiment of the present disclosure, the shortcut entrance can be provided on a batch deletion interface, so that the shortcut entrance can allow the user to view the detailed information of the deleted object, thereby making the user to reconfirm whether the deleted object can be deleted.

According to another aspect of the present disclosure, a specified content deletion method includes: determining whether a specified content meets a preset condition when receiving an operation instruction to delete the specified content; and determining whether to execute a deletion operation on the specified content according to a determination result.

When a user selects the specified content which needs to be deleted, the terminal can automatically determine whether the specified content can be directly deleted or not according to the preset condition. For example, a short message can include two types of short message such as a special short message including at least one phone number and a common short message exclusive of a phone number. The common short message can be directly deleted, but the terminal will determine whether the phone number in the special short message has been saved or not. Namely, the terminal will determine whether a processing state of the special short message is a completed state or not, that is, the terminal can determine whether the special short message has been processed. If the processing state of the special short message is the completed state, that is, the special short message has been processed, and the specified content meets the preset condition, and then the special short message can be deleted. Thus, when the short messages are deleted one by one or in batches, the terminal can automatically help the user to determine whether to delete the short messages, which can reduce the tedious operation on viewing the short messages, and reduce the probability of accidental deletions at the same time.

Preferably, in the above mentioned technical solution, before the step of determining whether a specified content meets a preset condition, the specified content deletion method further includes step of: labeling and processing the specified content according to a preset rule; and determining whether the specified content meets the present condition or not according to a label processing result. In the embodiment of the present disclosure, the preset condition includes types of the specified content and the processing states.

Before the step of determining whether a specified content meets a present condition, the terminal need preprocess each specified content, and label and process the specified content according to the preset rule. For example, the preset rule can be applied to an email, in detail, if an email has been checked and answered, then the email can be marked as processed, otherwise, it will be marked as unprocessed. At this point, the preset condition is: the email has been completed processing. Thus, the email that is marked as processed meets the preset condition, and when the user deletes the email, the user can delete the email directly, otherwise will not delete the email. In one embodiment, the preset rule can also be applied to an email with an attachment, if the attachment has been downloaded, then the email can be marked as processed, otherwise, it will be marked as unprocessed. At this point, the preset condition is: the email has been completed processing. Thus, the email that is marked as processed meets the preset condition, and when the user deletes the email, the user can delete the email directly, otherwise will not delete the email. In another embodiment, when the preset rule is applied to an email, if the email has not been checked, then the email will be marked as unprocessed, otherwise, it will be marked as processed. It should be understood that the preset rule can be an integration of the above mentioned several preset rules. For example, if a short message includes any selection or any combination of unchecked phone number, unsaved phone number and unprocessed schedule, then the short message is marked as a special short message, and the processing state of the short message is the completed state. When the user selects to delete the short message, the user also cannot delete the short message.

Preferably, in the above mentioned technical solution, the step of labeling and processing the specified content according to a preset rule includes: adding tag fields in a database of the specified content, wherein, different values of the tag fields represent different types and different processing states of the specified content. The step of determining whether the specified content meets the present condition or not according to a label processing result includes: determining whether the type and the processing state of the specified content are the same as the type and the processing state of the preset condition according to the tag field of the specified content; if the type and the processing state of the specified content are the same as the type and the processing state of the preset condition according to the tag field of the specified content, determining that the specified content meets the preset condition; if the type and the processing state of the specified content are different from the type and the processing state of the preset condition according to the tag field of the specified content, determining that the specified content does not meet the preset condition.

Taking the above embodiment as an example, several tag fields such as three tag fields can be added, in detail, the first tag field represents the email category, the second tag field represents whether the attachment in the email has been downloaded (that is, the processing state), and the third tag field is used to store schedule time of the email (the processing state can be figured out by comparing the schedule time with the present time). The first tag field includes a first value and a second value, and the first value represents that the email is a special email (that is, the email includes an attachment or the schedule time), and the second value of the first tag field represents that the email is a common email. The second tag field also includes a first value and a second value, and the first value represents that the attachment of the email has been downloaded, and the second value represents that the attachment has not been downloaded. When the email includes a schedule time, then the value of the third tag field is the schedule time.

Preferably, in the above mentioned technical solution, the terminal is configured for setting a value of the tag field according to a processing state that whether contact information is stored when the specified content includes the contact information. The terminal is configured for determining that the specified content meets the preset condition when determining that the processing state of the contact information in the specified content is the same as a processing state of the contact information in the preset condition according to the value of the tag filed.

Preferably, in the above mentioned technical solution, the terminal is further configured for saving a value of the tag field as schedule information when the specified content includes the schedule information. The terminal is configured for reading the value of the tag field, and comparing the schedule information with the present time to figure out the processing state of the schedule information and confirm the specified content meets the preset condition when the processing state of the schedule information in the specified content is the same as that of the schedule information in the preset condition.

Preferably, in the above mentioned technical solution, the terminal is further configured for setting a value of the tag field according to a processing state that whether attachment information is stored when the specified content includes the attachment information. The terminal is configured for determining that the specified content meets the preset condition when determining that the processing state of the attachment information in the specified content is the same as a processing state of the attachment information in the preset condition according to the value of the tag filed.

Preferably, in the above mentioned technical solution, the terminal is further configured for setting a value of the tag field according to a processing state that whether the specified content is checked or not. The terminal is configured for determining that the specified content meets the preset condition when determining that the processing state of the specified content is the same as a processing state of the preset condition according to the value of the tag field.

Preferably, in the above mentioned technical solution, the terminal is configured for prompting the user whether to delete the specified content and determining whether to delete the specified content according to a selection of the user when determining that the specified content meets the preset condition.

In one embodiment of the present disclosure, when determining that the specified content (such as short messages, multimedia messaging service (MMS)) includes unprocessed information, the terminal can prompt the user whether to delete the specified content or not. Thus, the specified content can be deleted upon receiving a confirmation of the user.

Preferably, in the above mentioned technical solution, the terminal provides a shortcut entrance on a prompt interface when prompting the user whether to delete the specified content, and the shortcut entrance is used for viewing detailed information of the specified content through a quick link. At the same time of prompting the user, the shortcut entrance can provide the user to view the detailed information of the specified content which meets the preset condition. So that the user can determine whether to delete the specified content after viewing the specified content, which further ensures the accuracy of deleted objects and also improve the user experience.

Preferably, in the above mentioned technical solution, the terminal provides a shortcut entrance on a deletion interface when receiving the operation instruction, which is used for viewing the detailed information of the specified content. In one embodiment of the present disclosure, the shortcut entrance can be provided on a batch deletion interface, so that the shortcut entrance can allow the user to view the detailed information of the deleted object, thereby making the user to reconfirm whether the deleted object can be deleted.

DETAILED DESCRIPTION OF ILLUSTRATED EMBODIMENTS

In order to illustrate the embodiments or existing technical solutions more clearly, a brief description of drawings that assists the description of embodiments of present disclosure or existing art will be provided below.

It would be apparent that the drawings in the following description are only for some of the embodiments of the disclosure. A person having ordinary skills in the art will be able to obtain other drawings on the basis of these drawings without paying any creative work.

The invention will now be described in detail on the basis of preferred embodiments and drawings. It is to be understood that various changes may be made without departing from the spirit and scope of the disclosure and the embodiments of the present disclosure and features in the embodiments can be combined with each other.

Figure 1:
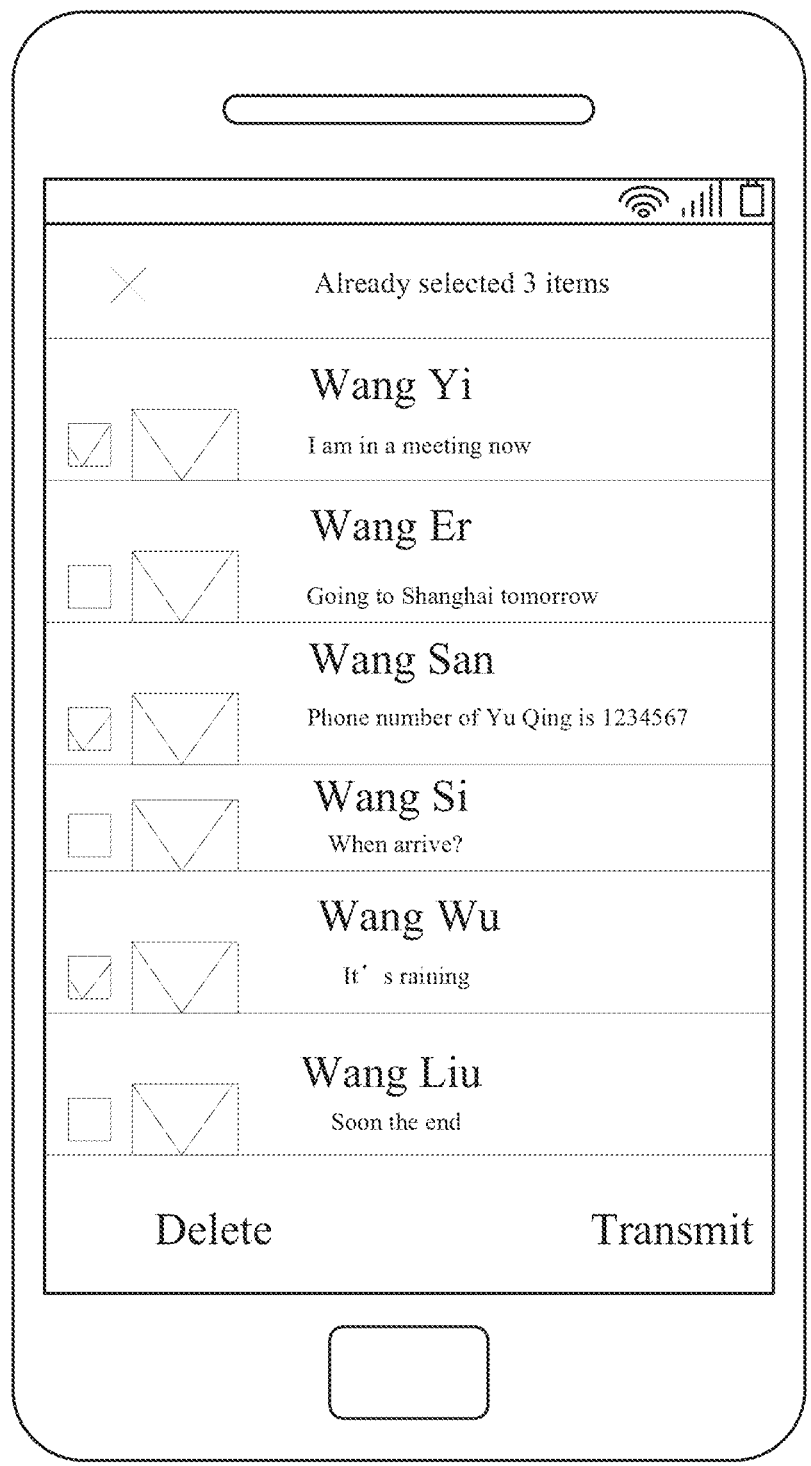
FIG. 1 is a schematic diagram of showing an operation of batch deletion in the existing technology.
Figure 2:
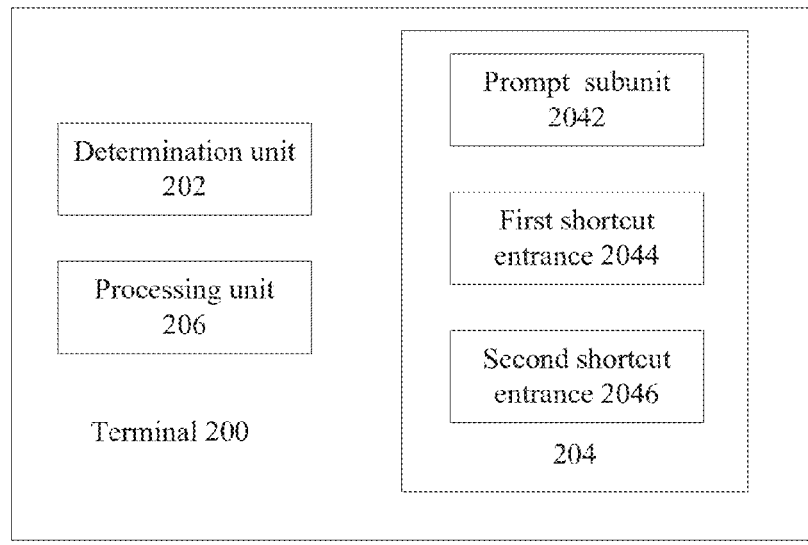
FIG. 2 is a block diagram of a terminal according to an embodiment of the present disclosure.

Referring to FIG. 2, FIG. 2 is a block diagram of a terminal according to an embodiment of the present disclosure.

As shown in FIG. 2, a terminal 200 provided by the embodiment of the present disclosure includes: a determination unit 202 and an execution unit 204. In the embodiment of the present disclosure, the determination unit 202 is configured for determining a specified content meets a present condition when receiving an operation instruction to delete the specified content. The execution unit 204 is configured for determining whether to execute a deletion operation on the specified content according to a determination result.

When a user selects the specified content which needs to be deleted, the determination unit 202 of the terminal 200 can automatically determine whether the specified content can be directly deleted or not according to the preset condition. For example, a short message can include two types of short message such as a special short message including at least one phone number and a common short message exclusive of a phone number. The common short message can be directly deleted, but the terminal will determine whether the phone number in the special short message has been saved or not. Namely, the terminal will determine whether a processing state of the special short message is a completed state or not, that is, the terminal can determine whether the special short message has been processed. If the processing state of the special short message is the completed state, that is, the special short message has been processed, and the specified content meets the preset condition, and then the special short message can be deleted. Thus, when the short messages are deleted one by one or in batches, the terminal 200 can automatically help the user to determine whether to delete the short messages, which can reduce the tedious operation on viewing the short messages, and reduce the probability of accidental deletions at the same time.

Preferably, in the above mentioned technical solution, the terminal 200 can further include a processing unit 206, and the processing unit 206 can be configured for labeling and processing the specified content according to a preset rule. The determination unit 202 is further configured for determining whether the specified content meets the present condition or not according to a label processing result of the processing unit 206. In the embodiment of the present disclosure, the preset condition includes types of the specified content and the processing states.

Before the determination unit 202 determines whether the specified content meets the present condition or not, the processing unit 206 need preprocess each specified content, and label and process the specified content according to the preset rule. For example, the preset rule can be applied to an email, in detail, if an email has been checked and answered, then the email can be marked as processed, otherwise, it will be marked as unprocessed. At this point, the preset condition is: the email has been completed processing. Thus, the email that is marked as processed meets the preset condition, and when the user deletes the email, the user can delete the email directly, otherwise will not delete the email. In one embodiment, the preset rule can also be applied to an email with an attachment, if the attachment has been downloaded, then the email can be marked as processed, otherwise, it will be marked as unprocessed. At this point, the preset condition is: the email has been completed processing. Thus, the email that is marked as processed meets the preset condition, and when the user deletes the email, the user can delete the email directly, otherwise will not delete the email. In another embodiment, when the preset rule is applied to an email, if the email has not been checked, then the email will be marked as unprocessed, otherwise, it will be marked as processed. It should be understood that the preset rule can be an integration of the above mentioned several preset rules. For example, if a short message includes any selection or any combination of unchecked phone number, unsaved phone number and unprocessed schedule, then the short message is marked as a special short message, and the processing state of the short message is the completed state. When the user selects to delete the short message, the user also cannot delete the short message.

Preferably, in the above mentioned technical solution, the processing unit 206 is further configured to add tag fields in a database of the specified content; different values of the tag fields represent different types and different processing states of the specified content. The determination unit 202 is further configured to determine whether the type and the processing state of the specified content are the same as the type and the processing state of the preset condition according to the tag field of the specified content. As a determination result, if the type and the processing state of the specified content are the same as the type and the processing state of the preset condition according to the tag field of the specified content, then the determination unit 202 determines that the specified content meets the preset condition; as another determination result, if the type and the processing state of the specified content are different from the type and the processing state of the preset condition according to the tag field of the specified content, then the determination unit 202 determines that the specified content does not meet the preset condition.

Taking the above embodiment as an example, several tag fields such as three tag fields can be added, in detail, the first tag field represents the email category, the second tag field represents whether the attachment in the email has been downloaded (that is, the processing state), and the third tag field is used to store schedule time of the email (the processing state can be figured out by comparing the schedule time with the present time). The first tag field includes a first value and a second value, and the first value represents that the email is a special email (that is, the email includes an attachment or the schedule time), and the second value of the first tag field represents that the email is a common email. The second tag field also includes a first value and a second value, and the first value represents that the attachment of the email has been downloaded, and the second value represents that the attachment has not been downloaded. When the email includes a schedule time, then the value of the third tag field is the schedule time.

For example, the processing unit 206 is further configured to set a value of the tag field according to a processing state that whether contact information is stored when the specified content includes the contact information. The determination unit 202 is configured to determine that the specified content meets the preset condition when determining that the processing state of the contact information in the specified content is the same as a processing state of the contact information in the preset condition according to the value of the tag filed.

For example, the processing unit 206 is further configured to save the value of the tag field as schedule information when the specified content includes the schedule information. The determination unit 202 is configured to read the value of the tag field, and compare the schedule information with the present time to figure out a processing state of the schedule information, and confirm the specified content meets the preset condition when the processing state of the schedule information in the specified content is the same as that of the schedule information in the preset condition.

Again for instance, the processing unit 206 is further configured to set a value of the tag field according to a processing state that whether attachment information is stored when the specified content includes the attachment information. The determination unit 202 is configured to determine that the specified content meets the preset condition when determining that the processing state of the attachment information in the specified content is the same as a processing state of the attachment information in the preset condition according to the value of the tag filed.

For another example, the processing unit 206 is further configured to set a value of the tag field according to a processing state that whether the specified content is checked or not. The determination unit 202 is configured to determine that the specified content meets the preset condition when determining that the processing state of the specified content is the same as a processing state of the preset condition according to the value of the tag field.

Preferably, in the above mentioned technical solution, the execution unit 204 includes a prompt subunit 2042, and the prompt subunit 2042 is configured to prompt the user whether to delete the specified content and determine whether to delete the specified content according to a selection of the user when the determination unit 202 determines that the specified content meets the preset condition.

In one embodiment of the present disclosure, when the determination unit 202 determines that the specified content (such as short messages, multimedia messaging service (MMS)) includes unprocessed information, the prompt subunit 2042 can prompt the user whether to delete the specified content or not. Thus, the specified content can be deleted upon receiving a confirmation of the user.

Preferably, in the above mentioned technical solution, the execution unit 204 includes a first shortcut entrance 2044. The first shortcut entrance 2044 is configured to provide a quick link on a prompt interface of the prompt subunit 2042, and the quick link is used for viewing detailed information of the specified content. At the same time of prompting the user, the first shortcut entrance 2044 can provide the user to view the detailed information of the specified content which meets the preset condition. So that the user can determine whether to delete the specified content after viewing the specified content, which further ensures the accuracy of deleted objects and also improve the user experience.

Preferably, in the above mentioned technical solution, the execution unit 204 further includes a second shortcut entrance 2046. The second shortcut entrance 2046 is configured to, when receiving the operation instruction, provide a quick link on a deletion interface, and the quick link is used for viewing the detailed information of the specified content.

In one embodiment of the present disclosure, the shortcut entrance can be provided on a batch deletion interface, so that the shortcut entrance can allow the user to view the detailed information of the deleted object, thereby making the user to reconfirm whether the deleted object can be deleted.

Figure 3:
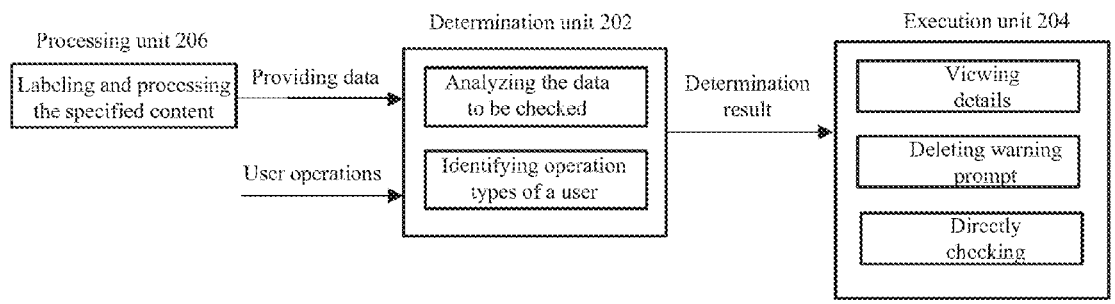
FIG. 3 is schematic diagram of operation principle of the terminal according to an embodiment of the present disclosure.

Combined with FIG. 3, the operating principle of the terminal of the present disclosure is described as follows. FIG. 3 is schematic diagram of operation principle of the terminal according to an embodiment of the present disclosure.

The Processing Unit 206

The processing unit 206 first preprocesses the specified content such as short message, if the short message includes a prescribed content (such as a preset keyword or a preset structure) in the preset rule, then the short message is marked as a special short message for further processing. The special short message mainly includes the following two categories:

(1) the short message whose message content containing the following content or the like: "phone number of Wang Xiaoming: 15811886789", "my new number: 18925478529, begin to use from next week, please keep", and so on; for such short messages, they will be marked as special types, and if the phone numbers in these short messages have been saved to the mobile phone, the short messages are also be marked;

(2) the short message whose message content containing the schedule information such as meeting or dating; the short message can also be marked as a special type, and the schedule time is recorded.

The above mentioned special short message can be processed as follows according to the preset rule: adding three fields (such as a first field, a second field and a third field) in the database of the short message, wherein, as shown in the table below, the first field is used to represent short message categories; wherein, 0 represents a common short message type, 1 represents a special short message type including the phone number, and 2 represents a short message including the schedule information. The second field is mainly used for the short message of type 1, and 0 represents the phone number in the short message has not been saved, and 1 represents the phone number in the short message has been saved. The third field is mainly used for the short message of type 2 and is used to store schedule time information extracted from the short message.

| Short message category | Processing state | Schedule time |
|---|---|---|
| 1 | 1 | 2013 Jan. 10 |

The Determination Unit 202

As shown in FIG. 3, the determination unit 202 first determines operation types of the user, in detail, if the operation type of the user is the viewing details, that is, the user wants to view the details of the short message, and then the user performs corresponding operations on viewing the details. If the operation type of the user is the checking operation on the short messages, that is, the user checks corresponding short messages, and then the user executes corresponding analysis on the short messages. In one embodiment of the present disclosure, analysis of checked short message includes the following steps: (a) reading the value of the first field as shown in the table above, wherein, if the value of the first field is 0, then the checked short message is a common short message; if the value of the first field is 1 which represents the checked short message includes a phone number, continuing to read the value of the second field to determine whether the phone number of the short message has been saved in the mobile phone, wherein, 0 of the value of the second field represents the phone number has been saved, and 1 of the value of the second field represents the phone number is not saved; continuing to read the schedule time in the third field if the value of the first field is 2 which represents the checked short message includes the schedule information; comparing the schedule time with the present time to determine whether the schedule time is over or not.

The Execution Unit 204

In one embodiment of the present disclosure, the execution unit 204 is configured to execute a corresponding operation on the specified content according to a determination result. In detail, if the determination unit 202 determines that the user wants to view the details of the short message, then the execution unit 204 provides and displays the details of the short message through a window which is one of the work areas on the screen of the mobile phone. If the determination unit 202 determines that the user wants to check a short message, and the short message contains unsaved information such as a phone number, then a corresponding dialog box is popped up and provides a prompt message "this message contains unsaved phone number, sure to delete?", and a shortcut entrance is provided on the window to view the details of the short message. If the short message checked by the user also contains uncompleted schedule information of date, then a corresponding dialog box is popped up and provides a prompt message "this message contains uncompleted schedule information, sure to delete?", and a shortcut entrance is provided on the window to view the details of the short message. If the user cancels the prompt message or determines the short message is a common short message or determines the phone number in the short message has been saved, then the user can directly check and delete the short message.

Figure 4:
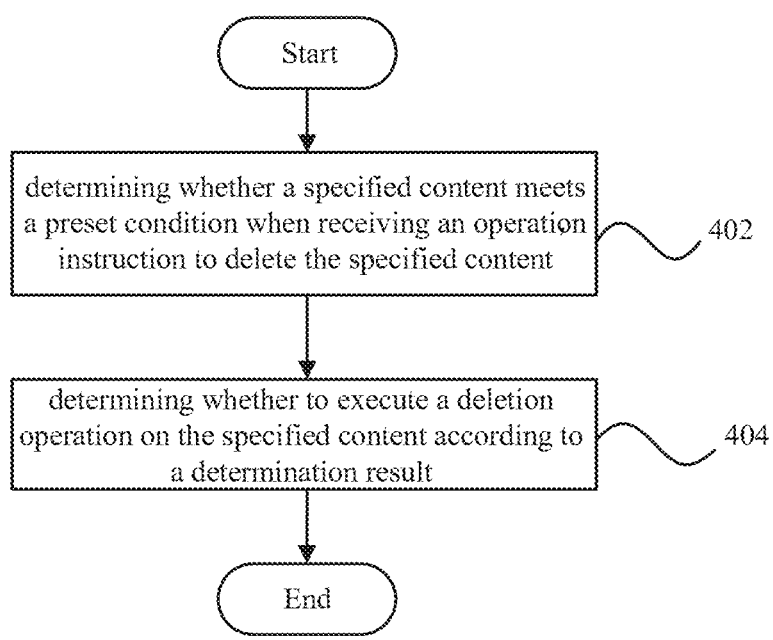
FIG. 4 is a flowchart of a specified content deletion method according to another embodiment of the present disclosure.

Referring to FIG. 4, FIG. 4 is a flowchart of a specified content deletion method according to another embodiment of the present disclosure.

As shown in FIG. 4, the specified content deletion method in the embodiment of the present disclosure can be applied to the terminal 200 as shown in FIG. 2 and include the following steps: step 402, determining whether a specified content meets a preset condition when receiving an operation instruction to delete the specified content; step 404, determining whether to execute a deletion operation on the specified content according to a determination result.

When a user selects the specified content which needs to be deleted, the terminal 200 can automatically determine whether the specified content can be directly deleted or not according to the preset condition. For example, a short message can include two types of short message such as a special short message including at least one phone number and a common short message exclusive of a phone number. The common short message can be directly deleted, but the terminal will determine whether the phone number in the special short message has been saved or not. Namely, the terminal will determine whether a processing state of the special short message is a completed state or not, that is, the terminal can determine whether the special short message has been processed. If the processing state of the special short message is the completed state, that is, the special short message has been processed, and the specified content meets the preset condition, and then the special short message can be deleted. Thus, when the short messages are deleted one by one or in batches, the terminal 200 can automatically help the user to determine whether to delete the short messages, which can reduce the tedious operation on viewing the short messages, and reduce the probability of accidental deletions at the same time.

Preferably, in the above mentioned technical solution, before the step of determining whether a specified content meets a preset condition, the specified content deletion method further includes step of: labeling and processing the specified content according to a preset rule; and determining whether the specified content meets the present condition or not according to a label processing result. In the embodiment of the present disclosure, the preset condition includes types of the specified content and the processing states.

Before the step of determining whether a specified content meets a present condition, the terminal 200 need preprocess each specified content, and label and process the specified content according to the preset rule. For example, the preset rule can be applied to an email, in detail, if an email has been checked and answered, then the email can be marked as processed, otherwise, it will be marked as unprocessed. At this point, the preset condition is: the email has been completed processing. Thus, the email that is marked as processed meets the preset condition, and when the user deletes the email, the user can delete the email directly, otherwise will not delete the email. In one embodiment, the preset rule can also be applied to an email with an attachment, if the attachment has been downloaded, then the email can be marked as processed, otherwise, it will be marked as unprocessed. At this point, the preset condition is: the email has been completed processing. Thus, the email that is marked as processed meets the preset condition, and when the user deletes the email, the user can delete the email directly, otherwise will not delete the email. In another embodiment, when the preset rule is applied to an email, if the email has not been checked, then the email will be marked as unprocessed, otherwise, it will be marked as processed. It should be understood that the preset rule can be an integration of the above mentioned several preset rules. For example, if a short message includes any selection or any combination of unchecked phone number, unsaved phone number and unprocessed schedule, then the short message is marked as a special short message, and the processing state of the short message is the completed state. When the user selects to delete the short message, the user also cannot delete the short message.

Preferably, in the above mentioned technical solution, the step of labeling and processing the specified content according to a preset rule includes: adding tag fields in a database of the specified content, wherein, different values of the tag fields represent different types and different processing states of the specified content. The step of determining whether the specified content meets the present condition or not according to a label processing result includes: determining whether the type and the processing state of the specified content are the same as the type and the processing state of the preset condition according to the tag field of the specified content; if the type and the processing state of the specified content are the same as the type and the processing state of the preset condition according to the tag field of the specified content, determining that the specified content meets the preset condition; if the type and the processing state of the specified content are different from the type and the processing state of the preset condition according to the tag field of the specified content, determining that the specified content does not meet the preset condition.

Taking the above embodiment as an example, several tag fields such as three tag fields can be added, in detail, the first tag field represents the email category, the second tag field represents whether the attachment in the email has been downloaded (that is, the processing state), and the third tag field is used to store schedule time of the email (the processing state can be figured out by comparing the schedule time with the present time). The first tag field includes a first value and a second value, and the first value represents that the email is a special email (that is, the email includes an attachment or the schedule time), and the second value of the first tag field represents that the email is a common email. The second tag field also includes a first value and a second value, and the first value represents that the attachment of the email has been downloaded, and the second value represents that the attachment has not been downloaded. When the email includes a schedule time, then the value of the third tag field is the schedule time.

For example, the terminal 200 is configured for setting a value of the tag field according to a processing state that whether contact information is stored when the specified content includes the contact information. The terminal 200 is configured for determining that the specified content meets the preset condition when determining that the processing state of the contact information in the specified content is the same as a processing state of the contact information in the preset condition according to the value of the tag filed.

For example, the terminal 200 is further configured for saving a value of the tag field as schedule information when the specified content includes the schedule information. The terminal 200 is configured for reading the value of the tag field, and comparing the schedule information with the present time to figure out the processing state of the schedule information and confirm the specified content meets the preset condition when the processing state of the schedule information in the specified content is the same as that of the schedule information in the preset condition.

Again for instance, the terminal 200 is further configured for setting a value of the tag field according to a processing state that whether attachment information is stored when the specified content includes the attachment information. The terminal 200 is configured for determining that the specified content meets the preset condition when determining that the processing state of the attachment information in the specified content is the same as a processing state of the attachment information in the preset condition according to the value of the tag filed.

For another example, the terminal 200 is further configured for setting a value of the tag field according to a processing state that whether the specified content is checked or not. The terminal 200 is configured for determining that the specified content meets the preset condition when determining that the processing state of the specified content is the same as a processing state of the preset condition according to the value of the tag field.

Preferably, in the above mentioned technical solution, the terminal 200 is configured for prompting the user whether to delete the specified content and determining whether to delete the specified content according to a selection of the user when determining that the specified content meets the preset condition.

In one embodiment of the present disclosure, when determining that the specified content (such as short messages, multimedia messaging service (MMS)) includes unprocessed information, the terminal 200 can prompt the user whether to delete the specified content or not. Thus, the specified content can be deleted upon receiving a confirmation of the user.

Preferably, in the above mentioned technical solution, the terminal 200 provides a shortcut entrance on a prompt interface when prompting the user whether to delete the specified content, and the shortcut entrance is used for viewing detailed information of the specified content through a quick link. At the same time of prompting the user, the shortcut entrance can provide the user to view the detailed information of the specified content which meets the preset condition. So that the user can determine whether to delete the specified content after viewing the specified content, which further ensures the accuracy of deleted objects and also improve the user experience.

Preferably, in the above mentioned technical solution, the terminal 200 provides a shortcut entrance on a deletion interface when receiving the operation instruction, which is used for viewing the detailed information of the specified content. In one embodiment of the present disclosure, the shortcut entrance can be provided on a batch deletion interface, so that the shortcut entrance can allow the user to view the detailed information of the deleted object, thereby making the user to reconfirm whether the deleted object can be deleted.

Figure 5:
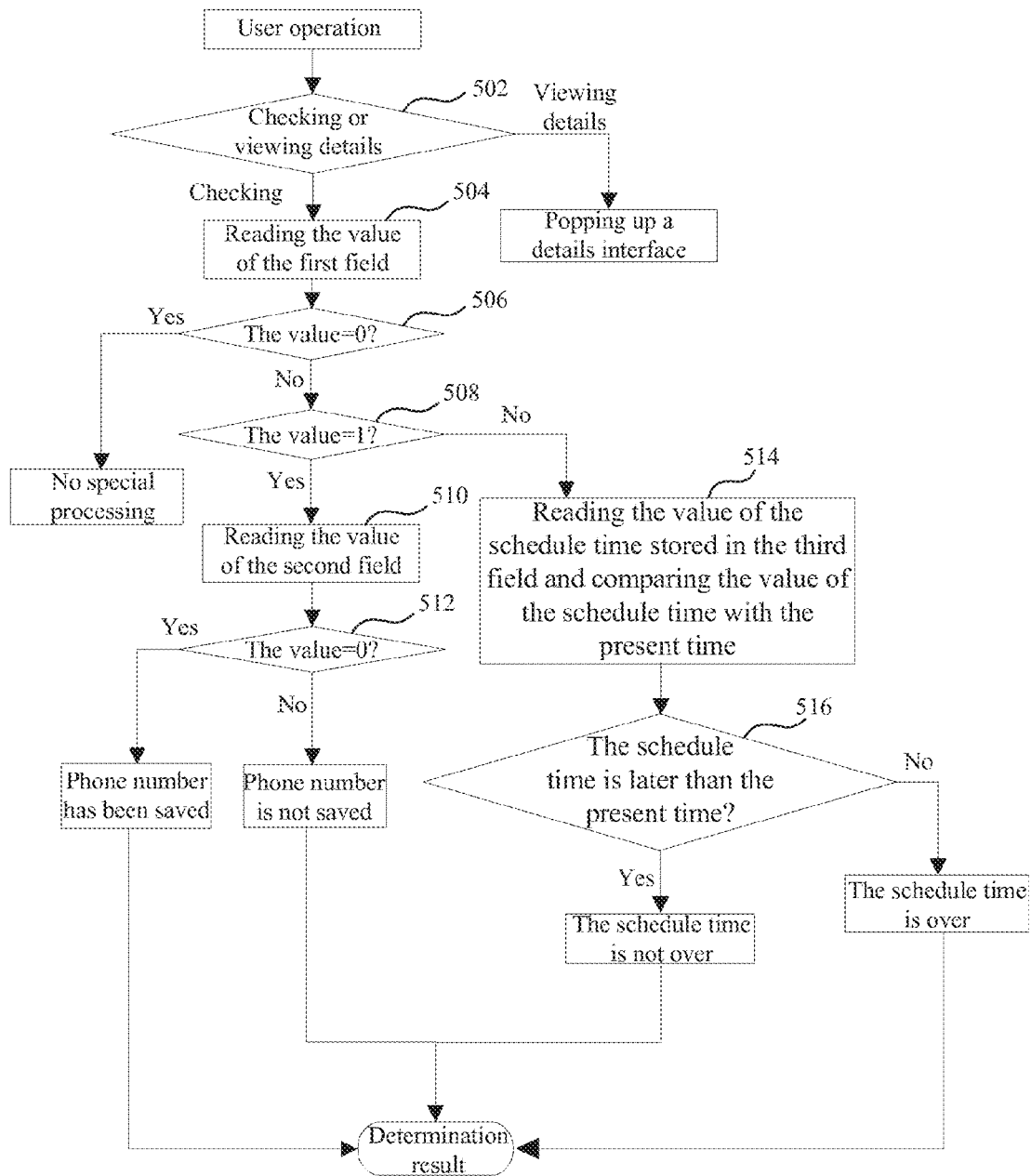
FIG. 5 is a flowchart of a step of determining whether a specified content can be deleted or not according to another embodiment of the present disclosure.
Figure 6:
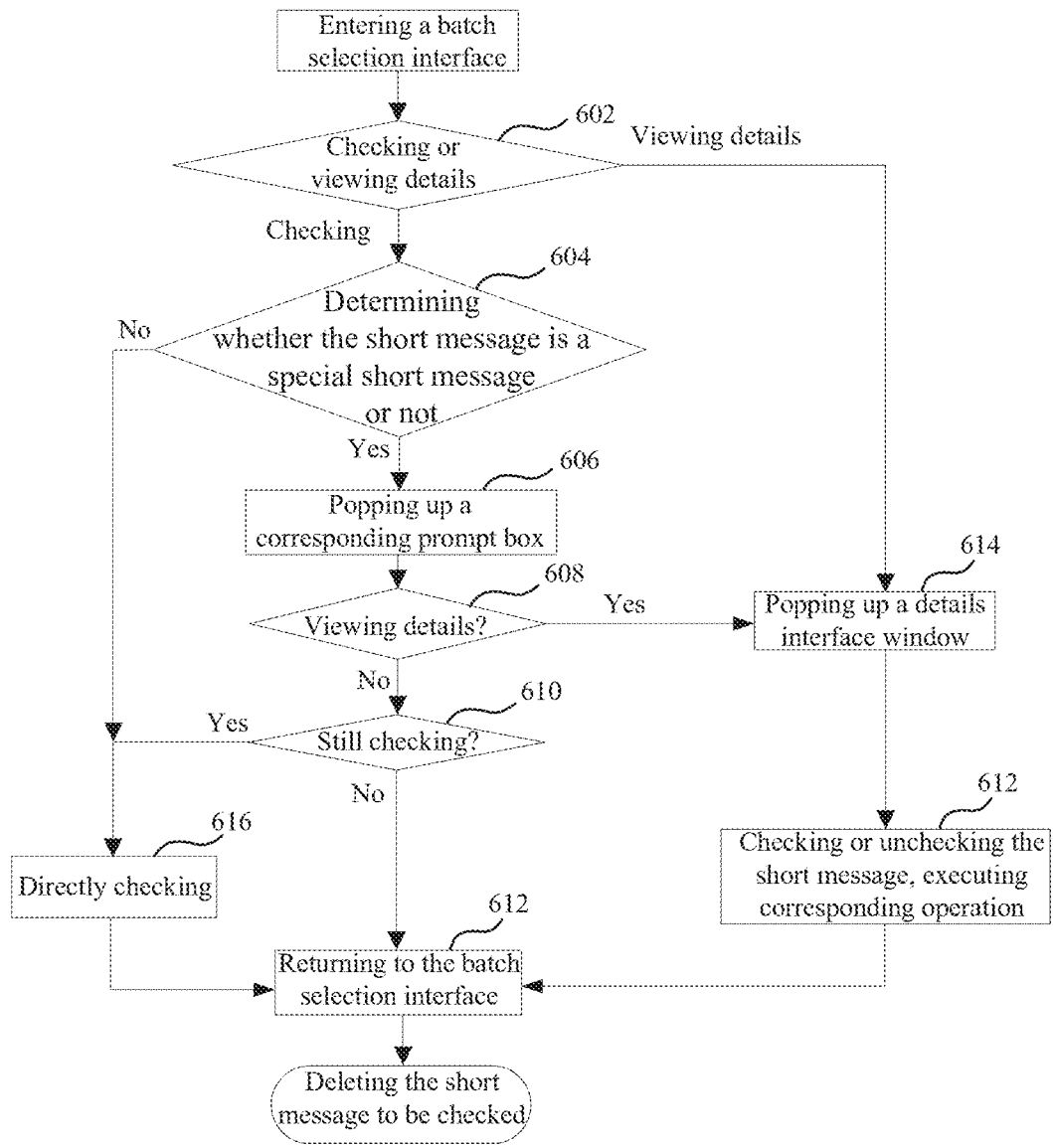
FIG. 6 is a flowchart of a step of executing a deletion operation on the specified content according to another embodiment of the present disclosure.

Referring to FIG. 5, FIG. 5 is a flowchart of a step of determining whether a specified content can be deleted or not according to another embodiment of the present disclosure.

As shown in FIG. 5, in step 502, determining the operation type of the user is a checking operation or a viewing details operation. In detail, when the user enters a deleting interface, the user can check the specified content that needs to be deleted; the deleting interface also provides a shortcut entrance for the user to view the specified content that needs to be deleted. If the operation type of the user is the checking operation, step 504 is performed; if the operation type of the user is the view details operation, a details interface is popped up for the user to view.

In step 504, reading the value of the first field in a database table of the specified content. In step 506, determining whether the value of the first field is equal to 0. If the value of the first field is equal to 0, special processing will be not done; if the value of the first field is not equal to 0, step 508 is performed.

In step 508, determining whether the value of the first field is equal to 1. If the value of the first field is equal to 1, step 510 is performed; if the value of the first field is not equal to 1, step 514 is performed.

In step 510, reading the value of the second field and entering step 512. In step 514, reading the value of the schedule time stored in the third field and comparing the value of the schedule time with the present time.

In step 516, determining whether the schedule time is later than the present time or not. If the schedule time is later than the present time, which means the schedule time is not over and the short message cannot be deleted; if no, which means the schedule time is over and the short message can be deleted.

In step 512, determining whether the value of the second field is equal to 0 or not. If the value of the second field is equal to 0, which means the phone number in the short message has been saved and the short message can be deleted; if no, which means the phone number in the short message is not saved and the short message cannot be deleted.

The above described description is the processing procedure of determining whether a specified content can be deleted or not.

Combined with FIGS. 6-8B as follows, deleting short messages in batches is used here as an example to specify a deletion process of the specified content of the present disclosure.

Figure 7A:
FIG. 7A is a schematic diagram of a batch selection interface according to an embodiment of the present disclosure.
Figure 7B:
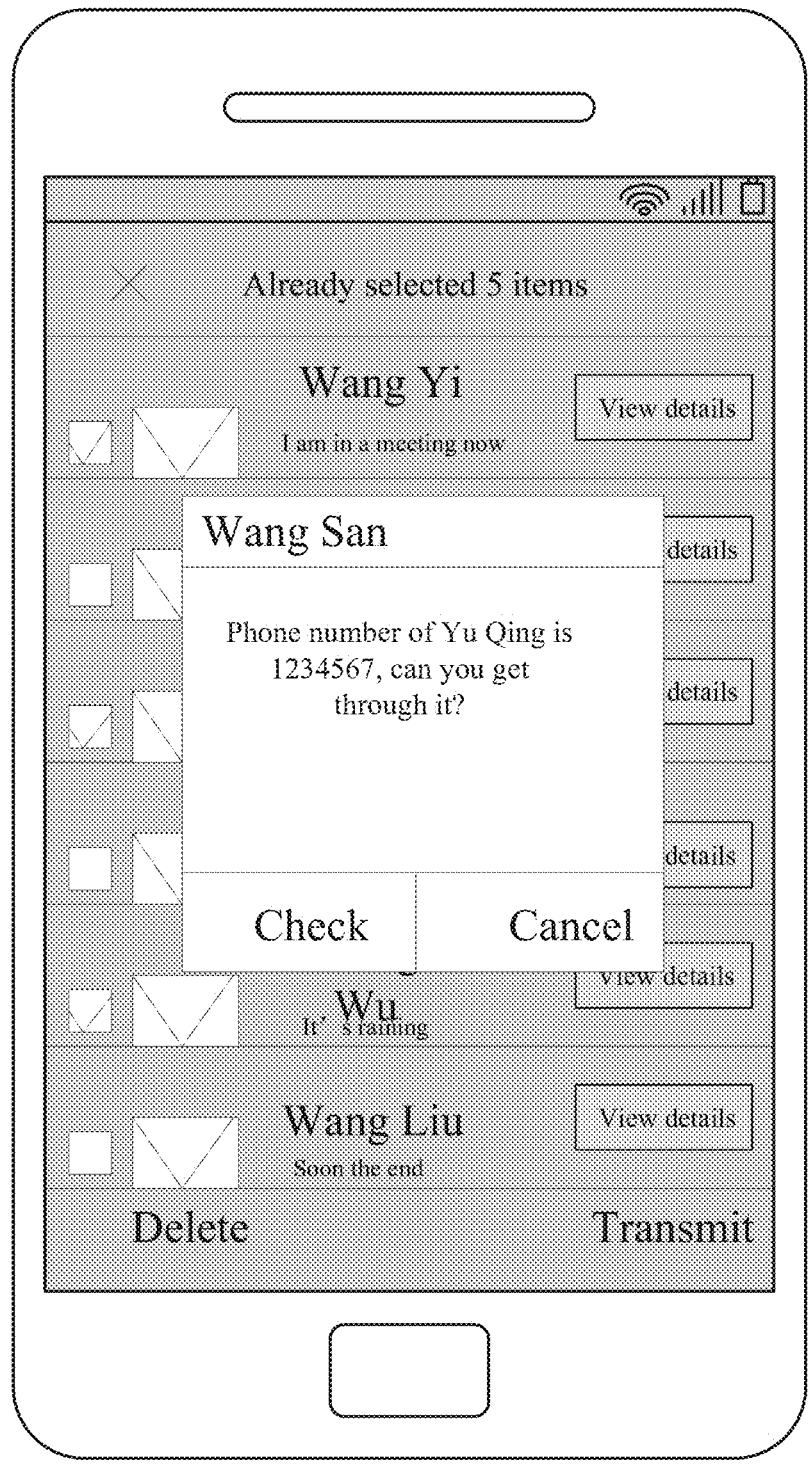
FIG. 7B is a schematic diagram of a details display interface according to an embodiment of the present disclosure.

In step 602, determining the operation type of the user is a checking operation or a viewing details operation. The user enters a batch selection interface and sends an operation instruction, and the terminal receives the operation instruction from the user and determines the operation type of the user is a checking operation or a viewing details operation. As shown in FIG. 7A, a shortcut entrance is provided and displayed in the batch deletion interface and is located corresponding to each short message in position, the shortcut entrance is used to view the details of the short message for the user. Thus, the user can view the short message that wants to be deleted through the shortcut entrance and check the short message after confirmation to prevent the short message being mistakenly deleted. As shown in FIG. 7B, the user clicks the option "viewing details" of a short message of a contact "Wang San", and a message viewing interface is displayed on the terminal to display the short message from "Wang San" and provides two options: "Check" and "Cancel". If the user clicks the option "Check", then the short message is regarded as a deleted object; if the user clicks the option "Cancel", then the short message is not regarded as a deleted object. If the operation type of the user is the checking operation, then step 604 is performed; if the operation type of the user is the viewing details operation, then step 614 of popping up a details interface window of the short message is performed.

In step 604, determining whether the short message which is check is a special short message or not. Because the short message has been marked, so it can be determined whether the short message is a special short message or not. If the short message is a special short message, step 606 is performed; if the short message is not a special short message, step 616 of directly checking the short message is performed.

Figure 8A:
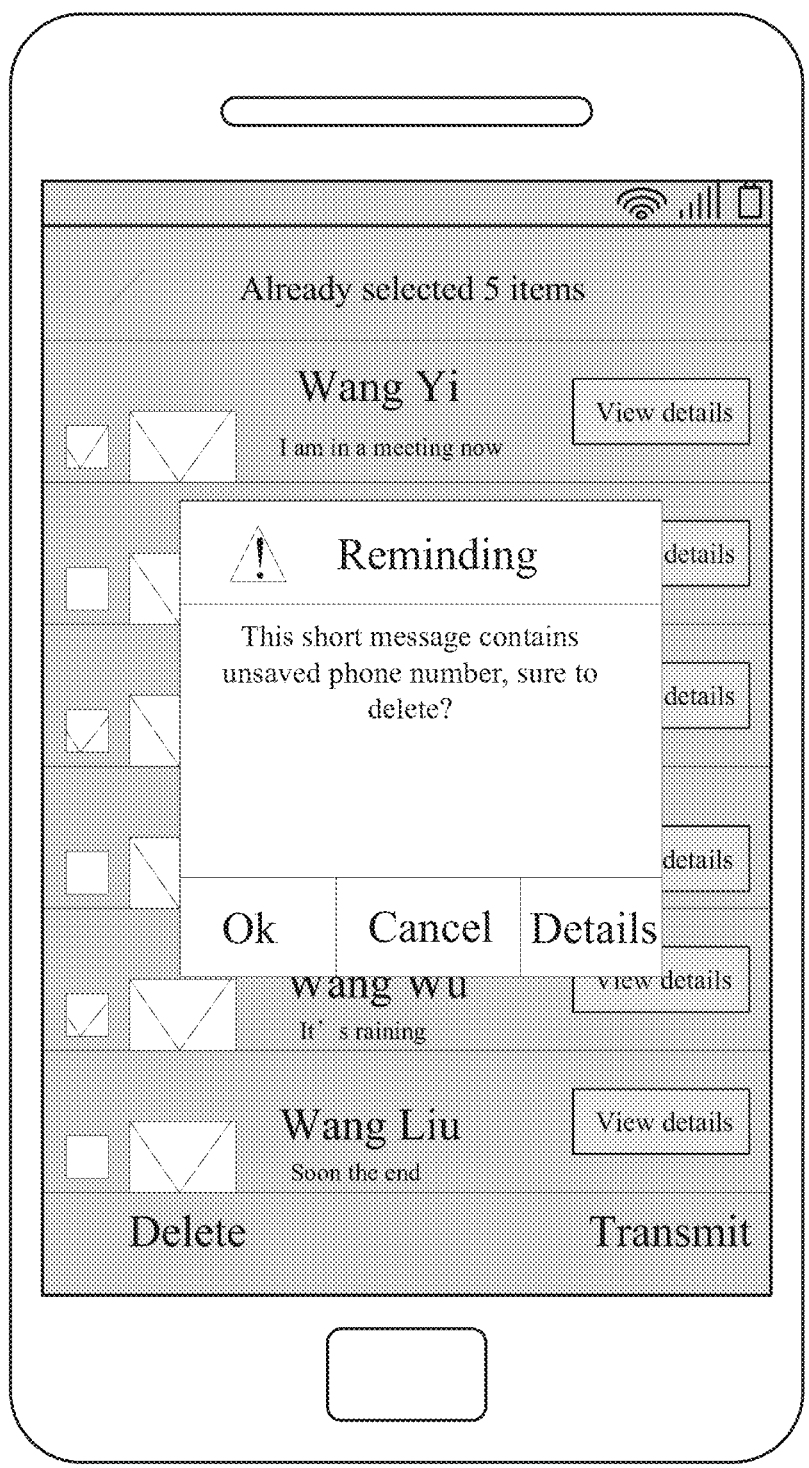
FIG. 8A is a schematic diagram of a prompt interface according to an embodiment of the present disclosure.
Figure 8B:
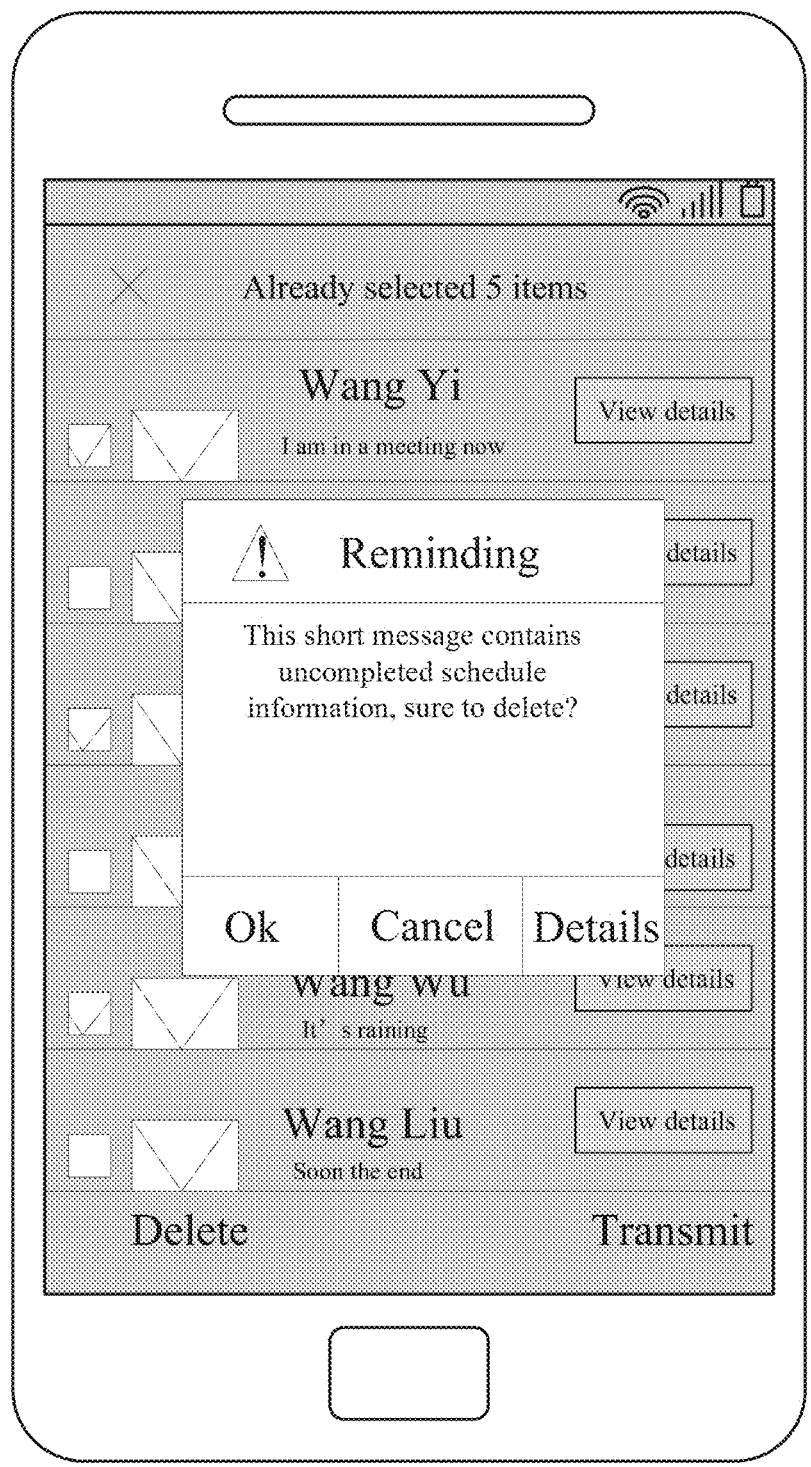
FIG. 8B is a schematic diagram of a prompt interface according to another embodiment of the present disclosure.

In step 606, popping up a corresponding prompt box to prompt the short message contains unsaved phone number as shown in FIG. 8A, or to prompt the short message contains uncompleted schedule time as shown in FIG. 8B. The prompt box includes three options: "Ok", "Cancel" and "Details". When the user clicks the option "Ok", the short message is regarded as a deleted object; when the user clicks the option "Cancel", then the short message is canceled; when the user clicks the option "Details", then the user can view the short message in detail, and can reconfirm whether to delete the short message, thereby further ensuring the accuracy of deletions.

In step 608, if the user clicks the option "Details", step 614 of popping up a details interface window of the short message is performed. In step 610, if the user does not check the short message, then step 612 of returning to the batch selection interface is performed; if the user selects to check the short message, then step 616 of checking the short message is performed. After the short message is checked, the deletion operation is executed to delete the short message to be checked.

According to the above processes, the user enters a short message service (SMS) inbox and clicks an option "Batch deleting" in menu buttons to enter the batch selection interface as shown in FIG. 7A. When the short message from the contact "Wang San" is checked, a prompt message "this message contains unsaved phone number, sure to delete?" is popped up as shown in FIG. 8A, after the user clicks the option "Details", a details interface as shown in FIG. 7B is provided and displayed. When the short message from the contact "Wang Wu" is checked, a prompt message "this message contains uncompleted schedule information, sure to delete?" is popped up as shown in FIG. 8B, after the user clicks the option "Cancel", then the short message will not be checked. Then the user returns to the batch selection interface and clicks the option "Delete" to delete all short messages which have been checked.

It should be understood that the deleted object (that is, the specified content) in above embodiments can be a SMS, a MMS, an email, a memo, a schedule or other objects including an important message (such as phone numbers, schedule time, attachment, event content and unchecked information). When the deleted object includes multiple important messages, the multiple important messages can be available to prompt the user one by one, or all the objects can be integrated in a prompt box to prompt the user.

Combined with the drawings, the above described embodiments explain the technical solution of the present disclosure. According to the technical solution, the user not only can check or uncheck the specified content in the list in the batch selection mode, but also can view the details content of a short message. Thus, when the user does not determine whether a short message should be deleted or not, the user can view the short message before making a decision to delete the short message or reserve the short message. The technical solution of the present disclosure executes special processing to the specified content: when the specified content is a short message, the short message can be divided into two categories: one kind of short message including someone's phone number which has not been saved, and another kind of short message including dating time or other schedule time which is not over. When the user checks any one of the above two categories of short messages, a corresponding prompt dialog box will pop up to allow the user to further confirm whether to delete the short message or not, which can greatly reduce the probability of accidental deletions, enable a deletion operation to be safer, and improve the user experience.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention.

What is claimed is:

1. A terminal comprising:
    a processor comprising hardware configured to:
        generate a database for a specified content, the database comprising at least a first tag field and a second tag field for the specified content, each tag field being determined by respective preset rules, the first tag field having values representing a type of the specified content and the second tag field having values representing a processing state of the specified content, wherein the type of the specified content is selected from a group consisting of a special short message service (SMS) or a common SMS, the special SMS being a SMS with contact information or schedule information, wherein when the specified content is determined to be the special SMS, the first tag field is set to a first value and when the specified content is determined to be the common SMS, the first tag field is set to a second value;
        determine whether the specified content meets a preset condition using at least the first tag field and the second tag field, when receiving an operation instruction to delete the specified content, the preset condition comprising at least a specific value for the type and a specific value for the processing state, wherein when the value of the first tag field for the specific content is equal to the specific value for the type and the value of the second tag field for the specific content is equal to the specific value for the processing state, the specified content meets the preset condition; and
        execute a deletion operation on the specified content when the preset condition is met.

2. The terminal according to claim 1, wherein, one of the respective preset rules is that the second tag field is set a value indicating the specified content has been processed when the specified content comprises contact information and the contact information is stored in a storage of the terminal and the second tag field is set to a value indicating the specified content has not been processed when the specified content comprises the contact information and the contact information is not stored in the storage of the terminal, wherein when the value of the second tag field indicates that the specific content has not been processed, the preset condition is not met.

3. The terminal according to claim 1, wherein, the database further comprises a third tag field generated by the processor comprising hardware, the third tag field representing schedule information, wherein when the specified content comprises the schedule information, a value of the third tag field is set to equal the schedule information in the specified content, wherein the preset condition further comprises a processing state of the schedule information, and
    the processor comprising hardware is configured to read the value of the third tag field, and compare the schedule information with the present time to figure out the processing state of the schedule information, and confirm the specified content meets the preset condition when the processing state of the schedule information in the specified content is the same as the processing state of the schedule information in the preset condition.

4. The terminal according to claim 1, wherein, one of the respective preset rules is that the second tag field is set a value indicating the specified content has been processed when the specified content is checked and responded and the second tag field is set to a value indicating the specified content has not been processed when the specified content is not checked and responded, wherein when the value of the second tag field indicates that the specific content has not been processed, the preset condition is not met.

5. The terminal according to claim 1, wherein, the processor comprising hardware is configured to prompt a user whether to delete the specified content and determine whether to delete the specified content according to a selection of the user when the processor comprising hardware determines that the specified content does not meet the preset condition.

6. The terminal according to claim 1, wherein the processor comprising hardware is configured to provide a quick link on a deletion interface, and the quick link is used for viewing detailed information of the specified content.

7. A terminal comprising:
a processor comprising hardware configured to:
generate a database for a specified content, the database comprising at least a first tag field and a second tag field for the specified content, each tag field being determined by respective preset rules, the first tag field having values representing a type of the specified content and the second tag field having values representing a processing state of the specified content,
wherein, one of the respective preset rules is that the second tag field is set a value indicating the specified content has been processed when the specified content comprises attachment information and the attachment information has been downloaded into a storage of the terminal and the second tag field is set to a value indicating that the specified content has not been processed when the specified content comprises the attachment information and the attachment information has not been downloaded into the storage of the terminal,
determine whether the specified content meets a preset condition using at least the first tag field and the second tag field, when receiving an operation instruction to delete the specified content, the preset condition comprising at least a specific value for the type and a specific value for the processing state, wherein when the value of the first tag field for the specific content is equal to the specific value for the type and the value of the second tag field for the specific content is equal to the specific value for the processing state, the specified content meets the preset condition; and
execute a deletion operation on the specified content when the preset condition is met, wherein when the value of the second tag field indicates that the specific content has not been processed, the preset condition is not met.

8. The terminal according to claim 7, wherein the type of the specified content is selected from a group consisting of a special email or a common email, the special email being an email with an attachment or schedule information, wherein when the specified content is determined to be the special email, the first tag field is set to a first value and when the specified content is determined to be the common email, the first tag field is set to a second value.

9. A specified content deletion method, comprising:
generating a database for a specified content, the database comprising at least a first tag field and a second tag field for the specified content, each tag field being determined by respective preset rules, the first tag field having values representing a type of the specified content and the second tag field having values representing a processing state of the specified content, wherein the type of the specified content is selected from a group consisting of a special short message service (SMS) or a common SMS, the special SMS being a SMS with contact information or schedule information, wherein when the specified content is determined to be the special SMS, the first tag field is set to a first value and when the specified content is determined to be the common SMS, the first tag field is set to a second value;
determining using at least the first tag field and the second tag field whether the specified content meets a preset condition when receiving an operation instruction to delete the specified content, the preset condition comprising at least a specific value for the type and a specific value for the processing state, wherein when the value of the first tag field for the specific content is equal to the specific value for the type and the value of the second tag field for the specific content is equal to the specific value for the processing state, the specified content meets the preset condition; and
deleting the specified content responsive to the preset condition being met.

10. The specified content deletion method according to claim 9, wherein, one of the respective preset rules is that the second tag field is set to a value indicating the specified content has been processed when the specified content comprises the contact information and the contact information is stored in a storage of a terminal and the second tag field is set to a value indicating the specified content has not been processed when the specified content comprises the contact information and the contact information is not stored in the storage of the terminal, wherein when the value of the second tag field indicates that the specific content has not been processed, the preset condition is not met.

11. The specified content deletion method according to claim 9, wherein, the database further comprises a third tag field, the third tag field representing schedule information, wherein when the specified content comprises the schedule information, a value of the third tag field is set to equal the schedule information in the specified content wherein the preset condition further comprises a processing state of the schedule information, and wherein the method further comprising:
reading the value of the third tag field, and comparing the schedule information with the present time to figure out the processing state of the schedule information and confirm the specified content meets the preset condition when the processing state of the schedule information in the specified content is the same as that of the schedule information in the preset condition.

12. The specified content deletion method according to claim 9, wherein, one of the respective preset rules is that the second tag field is set to a value indicating the specified content has been processed when the specified content is checked and responded and the second tag field is set to a value indicating the specified content has not been processed when the specified content is not checked and responded, wherein when the value of the second tag field indicates that the specific content has not been processed, the preset condition is not met.

13. The specified content deletion method according to claim 9, further comprising:
prompting a user whether to delete the specified content and determining whether to delete the specified content according to a selection of the user when determining that the specified content does not meet the preset condition.

14. The specified content deletion method according to claim 9, further comprising:
providing a shortcut entrance on a deletion interface for viewing detailed information of the specified content when receiving the operation instruction.

15. A specified content deletion method, comprising:
generating a database for a specified content, the database comprising at least a first tag field and a second tag field for the specified content, each tag field being determined by respective preset rules, the first tag field having values representing a type of the specified content and the second tag field having values representing a processing state of the specified content, wherein, one of the respective preset rules is that the second tag field is set to a value indicating the specified content has been processed when the specified content comprises the attachment information and the attachment information has been downloaded into a storage of a terminal and the second tag field is set to a value indicating that the specified content has not been processed when the specified content comprises the attachment information and the attachment information has not been downloaded into the storage of the terminal;

determining using at least the first tag field and the second tag field whether the specified content meets a preset condition when receiving an operation instruction to delete the specified content, the preset condition comprising at least a specific value for the type and a specific value for the processing state, wherein when the value of the first tag field for the specific content is equal to the specific value for the type and the value of the second tag field for the specific content is equal to the specific value for the processing state, the specified content meets the preset condition; and deleting the specified content responsive to the preset condition being met, wherein when the value of the second tag field indicates that the specific content has not been processed, the preset condition is not met.

* * * * *